(No Model.)

4 Sheets—Sheet 1.

F. H. RICHARDS.
WEIGHING AND BAGGING APPARATUS.

No. 589,296. Patented Aug. 31, 1897.

Witnesses:
J. L. Edwards Jr.
Fred. J. Dole.

Inventor:
F. H. Richards (No Model.) 4 Sheets—Sheet 3.

F. H. RICHARDS.
WEIGHING AND BAGGING APPARATUS.

No. 589,296. Patented Aug. 31, 1897.

Witnesses:
J. C. Edwards Jr.
Fred. J. Dole.

Inventor:
F. H. Richards (No Model.) 4 Sheets—Sheet 4.
F. H. RICHARDS.
WEIGHING AND BAGGING APPARATUS.
No. 589,296. Patented Aug. 31, 1897.
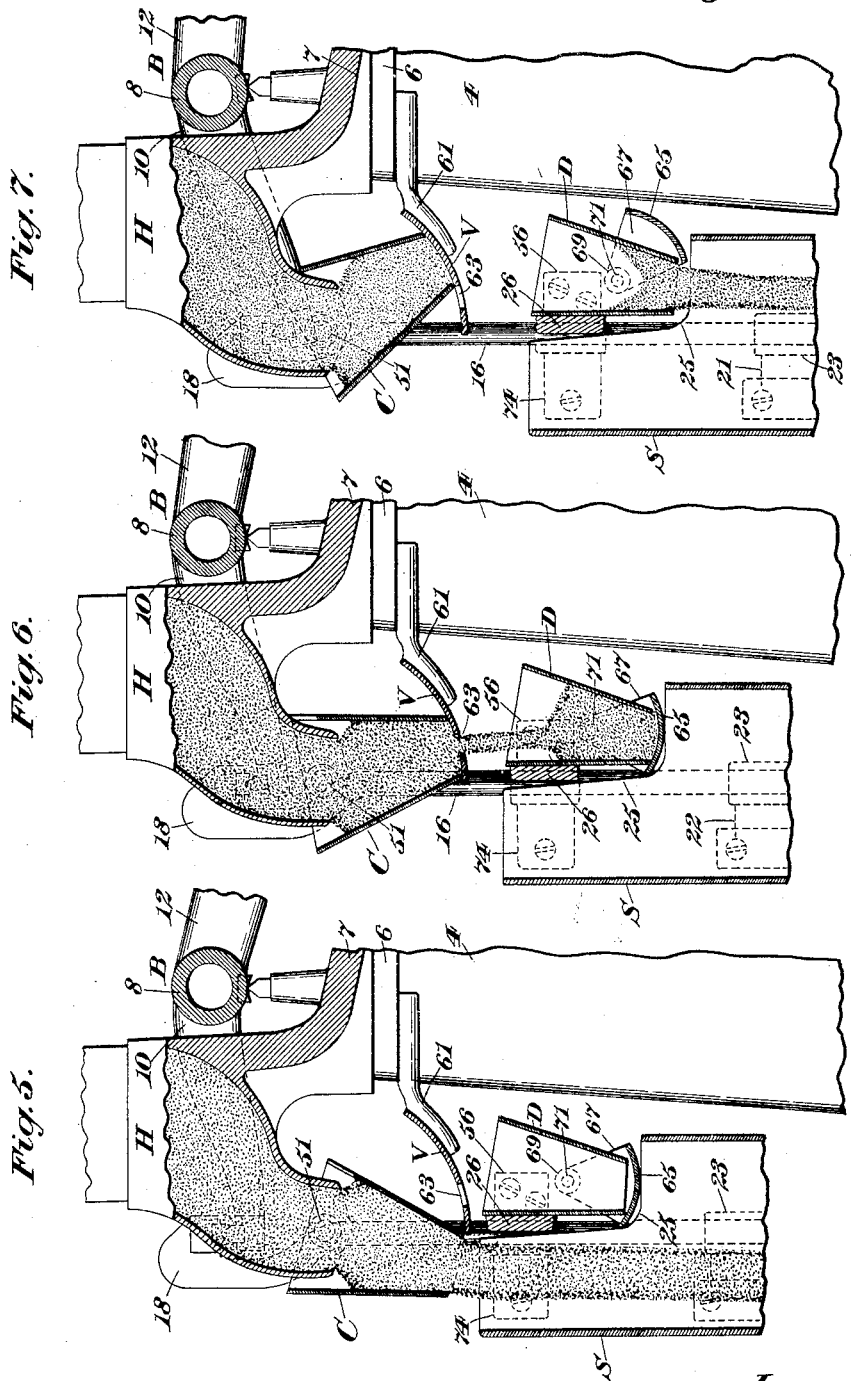
Witnesses:
J. L. Edwards Jr.
Fred. J. Dole.
Inventor:
F. H. Richards

UNITED STATES PATENT OFFICE.

FRANCIS H. RICHARDS, OF HARTFORD, CONNECTICUT.

WEIGHING AND BAGGING APPARATUS.

SPECIFICATION forming part of Letters Patent No. 589,296, dated August 31, 1897.

Application filed April 20, 1897. Serial No. 633,025. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing and Bagging Apparatus, of which the following is a specification.

This invention relates to weighing and bagging apparatus, the main object being to provide, in connection with a suitable scale-beam or equivalent device, a support for a receiver suspended from the scale-beam, a second receiver or drip-catcher also suspended from said scale-beam, stream-supplying means, a stream-controller, and a cut-off having a drip-opening, the stream-controller being so supported as, first, to deliver a stream of material to said receptacle, and, subsequently, to deliver a supply of material through said drip-opening and into the drip-catcher.

In the form of the invention illustrated said first-mentioned receiver consists of a bag into which is delivered the major part of a load, the balance of such load being supplied to the drip-catcher, which at the proper stage in the operation is discharged or emptied into the bag to complete the partial load therein, the stream-controller preferably consisting of a swinging spout coöperative with a fixed cut-off, whereby liability of blocking the stream-controller in its action is removed.

Figure 1:
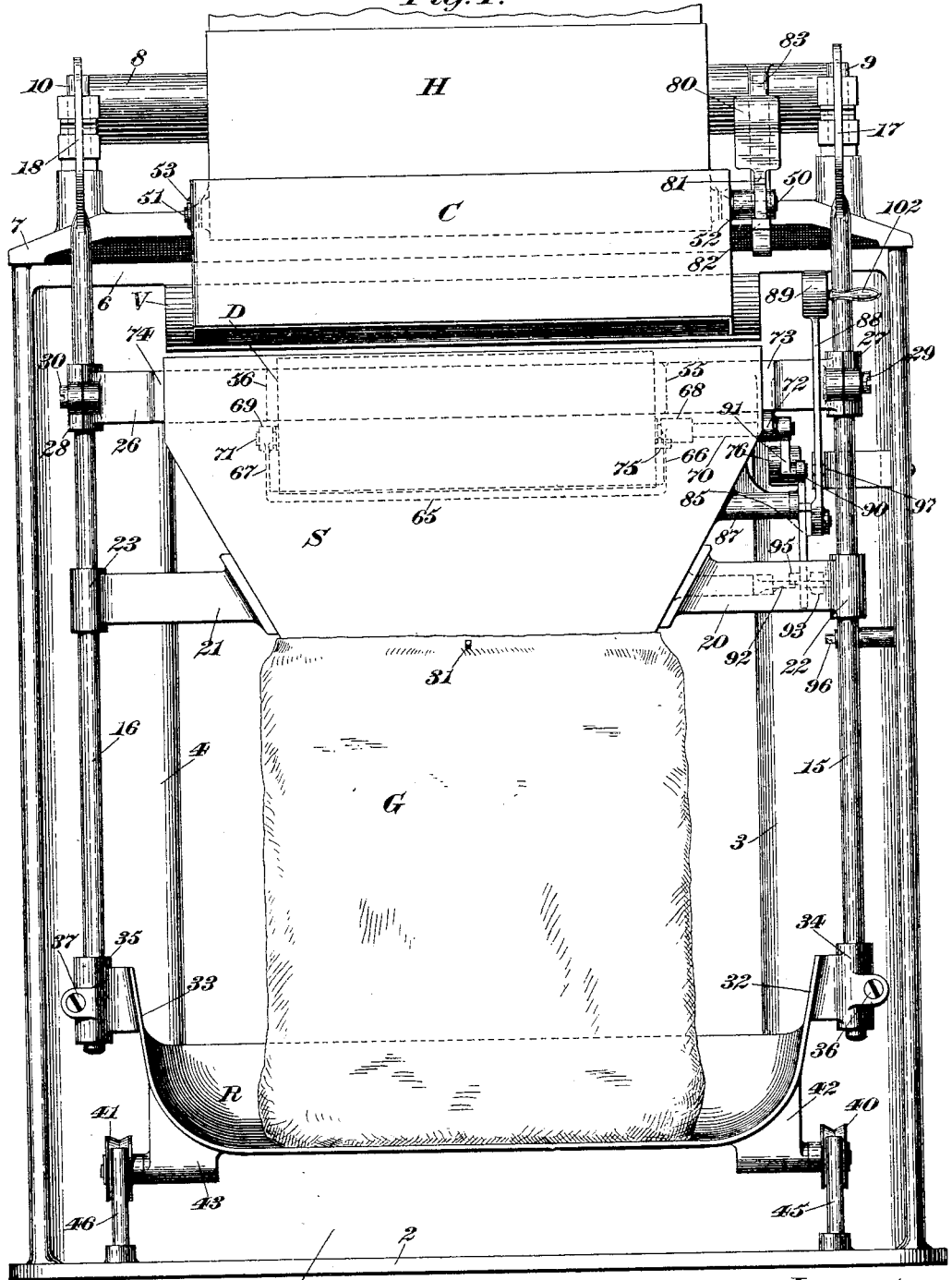
Figure 2:
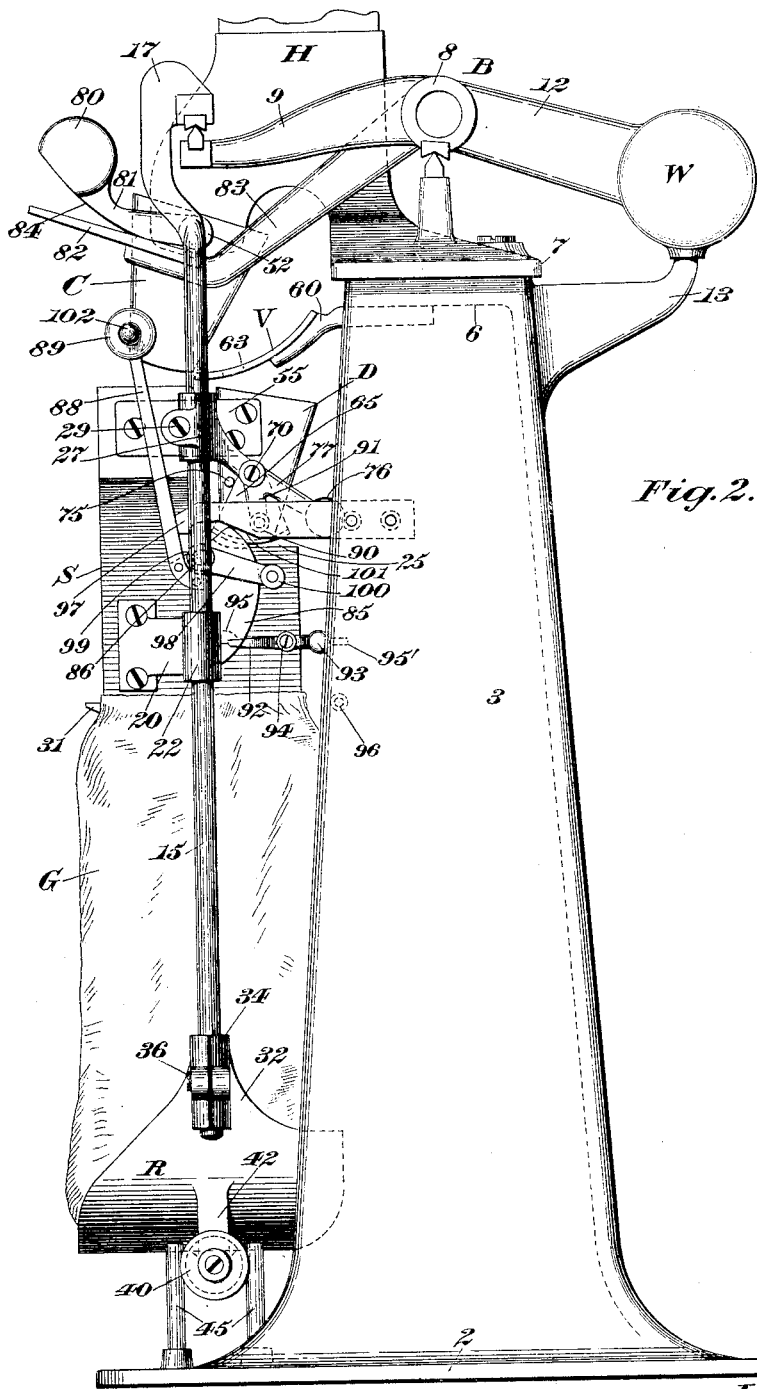
Figure 3:
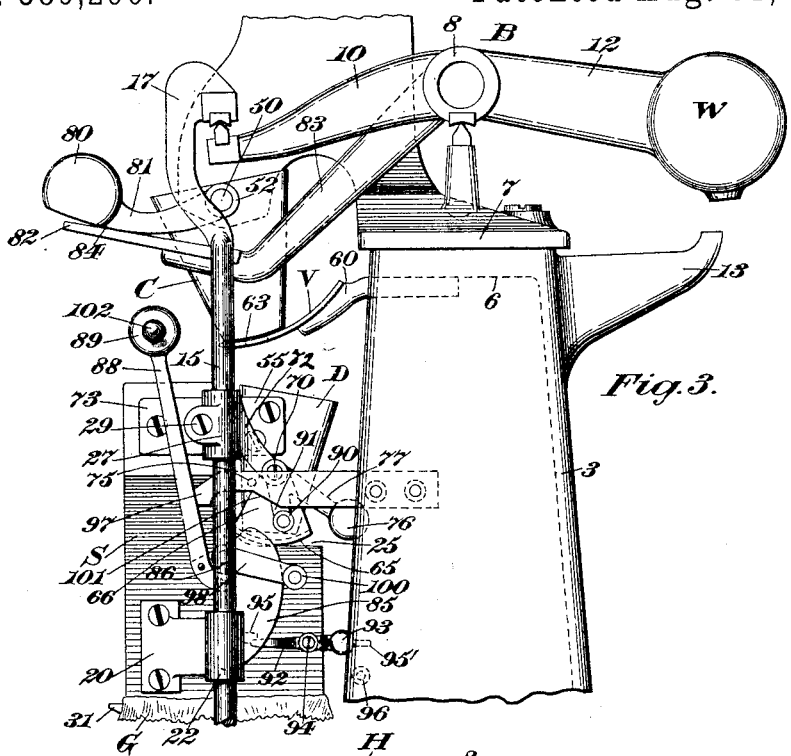
Figure 4:
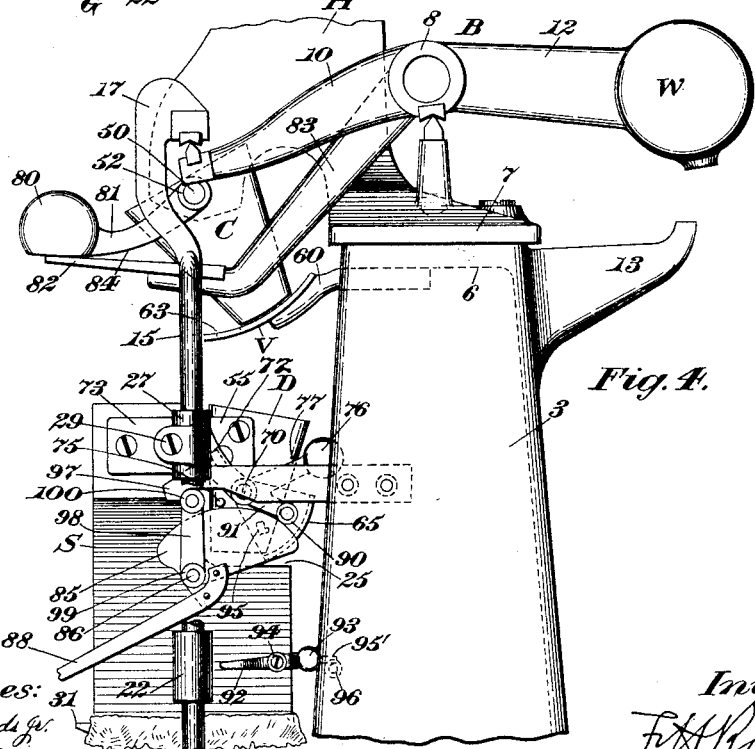

In the drawings accompanying and forming part of this specification, Figure 1 is a front elevation of my improved weighing and bagging apparatus. Fig. 2 is a side elevation of the apparatus as seen from the right in Fig. 1, both of said views showing the positions occupied by the different parts at the commencement of operation. Figs. 3 and 4 are similar views of the upper part of the machine, illustrating the positions assumed by the parts at two subsequent stages in the operation; and Figs. 5, 6, and 7 are longitudinal central sections of the supply mechanism and a portion of the weighing mechanism in positions corresponding, respectively, with Figs. 2, 3, and 4, a fragment of the framing being represented in elevation in said views.

Similar characters designate like parts in all the figures of the drawings.

The framework for carrying the several parts of the apparatus may be of any suitable or preferred construction, it consisting in the present case of the base or bed plate 2, the end columns 3 and 4, and the transverse plates 5 and 6, the latter being flat and being surmounted by the plate 7, to which is connected the supply-hopper, the two plates 6 and 7 being secured together in some convenient manner.

The scale-beam may be of any suitable construction, it being designated by B, and consisting in the present case of the transverse hollow shaft 8 and the arms 9, 10, and 12, extending therefrom. The arms 9 and 10 extend forwardly from the beam-shaft 8 and constitute a suitable means for supporting the load-receiving means, the arm 12 extending oppositely from said beam and being furnished with the counterweight W of a mass equaling the weight of the poising mechanism and the load carried thereby.

The counterweight when in its normal position is sustained by a suitable stop, as 13, extending rearward from the framework.

The beam-shaft 8 is preferably provided near its opposite ends with the usual depending V-shaped bearings, which are mounted on the ordinary knife-edge pivots secured to suitable posts near the opposite extremities of the top plate or beam 7.

The load-carrying means comprises a suitable receiver, such as the bag G, to which is supplied the major part of a predetermined load, the balance of such load being supplied to a suitable drip receiver or catcher, as will hereinafter appear, and said drip-receiver at a subsequent stage in the operation is emptied of its contents, the material passing into the bag to complete the partial load therein.

A pair of hangers are represented at 15 and 16, depending from the scale-beam B, said hangers being in the form of longitudinal bars furnished at their upper ends with the hooks 17 and 18, which are equipped with the usual V-shaped bearings resting on the ordinary knife-edge pivots suitably secured to the poising ends of the two arms 9 and 10, respectively, of the beam B.

The support for the bag G is designated by S, and it consists of a hopper of ordinary construction, to which are secured the oppositely-disposed brackets 20 and 21, which terminate in guide-sleeves 22 and 23, respectively, encircling the two hangers 15 and 16. The bag-support or hopper S, which is located below the mouth of the supply-hopper H, is cut away at its rear side, as at 25, and to the rear side of said hopper is secured the transverse flat beam or plate 26, said beam having at its opposite extremities the clamps 27 and 28, which embrace and slide on the hangers 15 and 16, respectively, whereby the bag-support or hopper can be readily raised or lowered, it being held in an adjusted position by the set-screws 29 and 30 on the two clamps 27 and 28. The bag-support or hopper S, near its lower forward side, is furnished with the projecting spur or hook 31, by which the bag G can be secured in place thereon, the bag preferably being supported by a rest R, which consists of a longitudinal shelf having the lateral projecting portions 32 and 33, furnished with clamps 34 and 35, respectively, which embrace the two hangers 15 and 16 and by which the bag-rest can be vertically adjusted, said rest being held in an adjusted position by the set-screws 36 and 37 on the two clamps.

Suitable guiding means will be provided for preventing undue oscillation of the hangers during the weighing operation, such means consisting of the projections 40 and 41, located at the opposite sides of the bag-rest R, said projections being in the form of antifriction-rolls suitably mounted on the depending lugs 42 and 43 on said bag-rest, the two rollers being reciprocatory between and substantially in contact with suitably-positioned posts arranged in pairs and fixed to the base-plate 2, the posts for the roll 40 being designated by 45, while the posts for the roll 41 are designated by 46.

The supply-hopper H constitutes a suitable means for delivering a stream of material to the load-carrying means, mounted on the scale-beam B, a suitable stream-controller, as C, coöperative with said supply-hopper, being adapted to first direct the stream into the bag-support or hopper S, from whence it passes into the bag G, and subsequently to deliver a drip-supply to a drip receiver or catcher, as will hereinafter appear.

The stream-controller consists in the present instance of a swinging tubular spout pivoted to the supply-hopper H in alinement with the discharge-orifice thereof, the pivots being designated by 50 and 51, respectively, and passing through the hubs, as 52 and 53, on the opposite walls of said stream-controller and working in suitable bearings on the end walls of the hopper, the hub 52 being somewhat elongated, as it carries an operating device for said stream-controller C.

The drip receiver or catcher is designated by D, and it consists in the present case of a hopper-shaped receptacle secured in the cut-away portion 25 of the hopper or bag-support S, said drip-catcher D being fitted against the flat face of the transverse beam or plate 26. Said beam or plate is furnished at suitable points thereon with the flanges 55 and 56, between which is suitably secured the drip-catcher D.

In connection with the stream-controller or swinging spout C, I provide a cut-off, as V, which consists in the present instance of a curved plate concentric with the axis of oscillation of said spout and attached to the arms 60 and 61, respectively, which are secured to the under side of the transverse plate 6, said cut-off V having midway between its front and rear ends the longitudinal drip opening or slot 63, through which a small stream of material can pass from the stream-controller or swinging spout C to enter the drip receiver or catcher D.

The drip receiver or catcher D is preferably furnished with a valve, whereby it is made to retain the drip-supply, and so that it can be automatically discharged at the proper stage, said valve being designated by 65 and being of the "pan" type, the upright arms 66 and 67 on the opposite ends of said valve being furnished with the hubs 68 and 69 for receiving suitable pivot-screws, as 70 and 71, which work in bearings in the opposite ends of said drip receiver or catcher, the pivot-screw 70 being also carried by the depending bearing or bracket 72. The bearing or bracket 72 is formed on the flange or lug 73, secured to one end of the bag-support S, a similar lug or flange 74 being secured to the opposite end of said bag-support.

The valve 65 is normally maintained in a closed position, the arm 66 of said valve being held against the projecting stop 75 on the end of the hopper by the weight 76 on the rear end of the arm 77, secured to the valve-pivot 70, said weight also acting to close the valve.

The stream-controller or spout C is represented in its extreme outward position in Fig. 1, and on the descent of the poising end of the scale-beam B it is shifted rearward and is carried over the stationary cut-off V, whereby the two parts or members coöperate to reduce the supply, and when the bag G has received the requisite quantity of material the spout C will have reached a point opposite or over the drip-opening 63, whereby a stream of comparatively small volume can pass through said opening and into the drip receiver or catcher D, the valve of which is in its closed position. For thus operating the stream-controller to shift it rearward any suitable means may be provided, such as the weight 80, formed on the end of the cam-arm 81, secured to the elongated hub 52, the counterweighted arm 81, resting on the straight arm 82, which is secured to the oblique arm 83, extending forward from the beam-shaft S, said arm 82 being adapted to support the cam-face 84 of the counterweighted arm 81, whereby as the poising end of the beam drops the weight 80 can fall, so that the supply to the bag G is properly graduated and the spout C swung over the cut-off V to permit the drip-stream to pass through the opening 63 and into the drip-catcher D, the weight 80 advancing the spout in a coinciding direction on the completion of a load, whereby said spout is carried past said drip-opening for stopping the supply to the drip-catcher D.

When the drip receiver or catcher D has received the necessary supply of material, means will be brought into action for opening the valve 65, whereby such material will be caused to enter the bag G after having passed through the hopper or bag-support S, and the means herein represented for operating said valve to open the same consists of the cam 85, pivoted at 86 to the projection 87 on the end of the bag-support, said cam having the arm 88, suitably secured thereto, said arm being furnished at its upper end with a weight 89, of suitable efficiency, for actuating the cam. The cam 85 coöperates with the projection or roll 90 on the branch arm 91, extending from the counterweighted arm 77, and the cam is adapted to impinge against said projection or antifriction-roll at the proper stage to force the valve open.

During the greater period of operation of the apparatus the cam will be held ineffective, a suitable latch, as 92, being furnished for this purpose, said latch being counterweighted, as at 93, and pivoted, as at 94, to the end of the hopper S, the working arm of the latch being adapted to engage the shouldered lug 95 on the inside face of the cam. When the bag G and drip receiver or catcher D have received their necessary supplies of material, the teat 95' on the weight 93 of the latch will abut against the tripper or stop 96 on the frame member 3, whereby the latch 92 will be tripped and its working arm disengaged from the shouldered lug 95 on the cam. When this action takes place, the cam 85 will be instantly swung about its center by the dropping of the weight 89, whereby the working face of the cam will engage the roll 90, as indicated in Fig. 4, to swing the valve 65 open, so that the contents of the drip-catcher D can pour into the bag G, subsequent to which the filled bag can be removed.

Means will be provided for preventing the ascent of the poising side of the beam and the various parts suspended therefrom on the removal of the filled bag, such means consisting in the present case of the stationary cam 97, suitably secured to the inside of the frame member 3, and the locking-arm 98, secured to the hub 99 of the cam 85.

The locking-arm 98 is furnished at its outer end with the antifriction-roll 100, which on the release of the oscillatory cam 85 in the manner hereinbefore specified will swing therewith and will ride along the working face 101 of the fixed cam 97 until said locking-arm reaches a perpendicular or vertical position, as represented in Fig. 4, so that the ascent of the various parts is effectively blocked.

It will be understood that when the roll 100 is in contact with the face 101 of the cam 97 the apparatus is held out of action, and to return the same to action manually-operated means are provided, such means consisting in the present case of the handle 102 on the valve-operating weight 89, which handle is grasped by the attendant to swing the cam 85 about its axis to a position where its lug 95 can be engaged by the latch 92, and on such operation the roll 100 will be disengaged from the cam-face 101, whereby the apparatus is unlocked, and the parts can resume their primary positions. (Represented in Fig. 2.)

The operation of the hereinbefore-described machine, briefly stated, is as follows: Fig. 2 represents the positions occupied by the various parts at the commencement of operation, the empty bag G being supported on the rest R, having its mouth disposed below the support S and secured to the spur 31, the valve 65 of the drip-catcher D being shut, and the spout C being in its extreme outward position a stream of relatively large volume will pass through the hopper H, through the spout C and bag-support or hopper S, and into the bag G; and when a certain part of the supply has been received the poising side of the beam B will fall, the arms 83 and 82 moving therewith, and the last mentioned, falling away from the counterweighted arm 81, will permit the weight 80 to drop and to swing the spout C rearward and over the cut-off V, whereby, at the commencement of the poising period, the cut-off will stop the supply of material from the spout C from entering the bag G, the latter having received the requisite amount of material.

At the commencement of the poising period, as indicated in Fig. 3, the stream-controller or spout C will be over the drip-opening 63 in the cut-off V, whereby a small stream will pass through the said opening and enter the drip-catcher D, the parts continuing to descend until the weight 80 moves the spout C past the opening 63, at which time the passage of material to the drip-catcher D is arrested. At about this time the teat 95' will abut against the stop 96 on the framework, whereby the latch 92 will be tripped, as shown in Fig. 4, and disengaged from the shouldered lug 95 of the oscillatory cam 85, so that said cam, and consequently the weight 89, are released. When this action takes place, the weight 89 will instantly drop, so that the cam 85 will be swung about its center, and its working face will be carried in contact with the roll 90, thereby forcing the valve 65 open and permitting the contents of the drip-catcher D to pass into the nearly-filled bag G to complete the load therein. As the cam 85 is thus operated the locking-arm 98 will move simultaneously therewith and the roll 100 of said arm will ride along the cam-face 101 of the stationary cam 97 until said arm reaches a perpendicular position, whereby, when the filled bag G is removed, the ascent of the parts is prevented, thereby throwing the apparatus momentarily out of action.

To return the apparatus to action, the handle 102 will be grasped and the arm 88 swung about its axis, thereby returning the cam 85 to its normal position, where its lug 95 can be engaged by the latch 92, and as the arm is thus manually operated the roll 100 will be disengaged from the working face of the stationary cam 97, thereby unlocking the apparatus.

Having described my invention, I claim—

1. The combination, with a scale-beam, of two receivers suspended therefrom; stream-supplying means; a cut-off having a drip-opening; and a swinging stream-controller supported, first, to deliver the stream to one of said receivers, and, subsequently, to deliver a supply of material through said drip-opening to the other receiver.

2. The combination, with a scale-beam, of two receivers suspended therefrom; stream-supplying means; a stationary cut-off having a drip-opening; and a swinging stream-controller supported, first, to deliver the stream to one of said receivers, and, subsequently, to deliver a supply of material through said drip-opening to the other receiver.

3. The combination, with a scale-beam, of two receivers suspended therefrom; stream-supplying means; a stationary cut-off mounted on the framework and having a drip-opening; and a swinging stream-controller supported, first, to deliver a stream of material to one of said receivers, and, subsequently, to deliver a supply of material through said opening to the other receiver.

4. The combination, with a scale-beam, of two receivers suspended therefrom; stream-supplying means; a stationary cut-off having a drip-opening; and a swinging spout supported, first, to deliver the stream to one of said receivers, and, subsequently, to deliver a supply of material through said drip-opening to the other receiver.

5. The combination, with a scale-beam, of two receivers suspended therefrom; stream-supplying means; a cut-off having a drip-opening; arms secured to said cut-off and also to the framework; and a swinging spout supported, first, to deliver the stream to one of said receivers, and, subsequently, to deliver a supply of material through said drip-opening to the other receiver.

6. The combination, with a scale-beam, of two receivers suspended therefrom; stream-supplying means; a cut-off having a drip-opening; and means coöperative with the scale-beam, for swinging said spout over the cut-off, on the descent of the said receivers, whereby a supply of material will be caused to pass through said drip-opening and into one of the receivers, and for subsequently swinging said spout into a corresponding direction to carry it past said drip-opening.

7. The combination, with a scale-beam, of two receivers suspended therefrom; stream-supplying means; a cut-off having a drip-opening; a swinging stream-controller; means for swinging said stream-controller over the cut-off, on the descent of the scale-beam, whereby a supply of material will be caused to pass through said drip-opening and into one of said receivers, and for subsequently swinging said steam-controller in a corresponding direction to carry it past said drip-opening; and instrumentalities for discharging one of said receivers into the other.

8. The combination, with a scale-beam having an arm connected therewith, of a supply-hopper; a swinging spout; a counterweighted arm operative with said spout and adapted to rest on the arm of the scale-beam; a stationary cut-off secured to the framework and having a drip-opening; two receivers suspended from the scale-beam; and means, operative at a predetermined point, for discharging one of said receivers into the other.

9. The combination, with a scale-beam; of a support for a bag, suspended from the scale-beam, said bag being adapted to receive the major part of a load; a drip-catcher also suspended from the scale-beam; a valve for said drip-catcher; stream-supplying means; a cut-off having a drip-opening; a swinging spout; means for shifting said spout to carry it over the cut-off and then past the drip-opening therein; and instrumentalities adapted to open said valve, whereby the contents of the drip-catcher can enter the bag.

10. The combination, with a scale-beam, of two receivers suspended therefrom side by side; stream-supplying means for said receivers; a valve for controlling the discharge of material from one of said receivers; means supported independently of the valve, for operating the same; a latch normally effective for holding said valve-operating means out of action; and a tripper for said latch.

11. The combination, with a scale-beam, of two receivers suspended therefrom one of which is valved, said valved receiver being adapted to catch the drip; a cam supported independently of the valve, for operating the same; a latch normally effective for holding said cam against action; and a tripper for said latch, adapted to release the cam whereby it will open the valve to permit the drip to flow from the receiver.

12. The combination, with a scale-beam, of two receivers suspended therefrom one of which is adapted to catch the drip-stream and is valved; stream-supplying means for said receiver; a cam supported independently of the valve, for operating the same; a counterweighted arm connected with said cam; a latch adapted to engage the cam; and a tripper for the latch, operative to release the cam whereby the valve will be opened.

13. The combination, with a scale-beam, of two receivers suspended therefrom one of which has a valve and is adapted to catch the drip; stream-supplying means for said receivers; a cam supported independently of the valve, for operating the same; a latch adapted normally to hold the cam against action; a tripper for the latch, mounted on the framework; a counterweighted arm connected to said cam, the weight of said arm being furnished with a handle.

14. The combination, with a scale-beam, of two receivers suspended therefrom one of which has a valve and is adapted to catch the drip-stream; stream-supplying means for said receivers; a stationary cut-off having a drip-opening to deliver the drip-stream to the drip-catching receptacle; a swinging spout coöperative with said cut-off; a cam for operating the valve; and a latch adapted normally to hold the cam against action.

15. The combination, with a scale-beam, of a bag-support suspended therefrom; means for securing a bag to said support; a drip-hopper also suspended from the scale-beam and provided with a valve and also with a stop; a counterweighted arm connected with the valve and adapted to hold the same against said stop; stream-supplying means; a cam for operating said valve; means normally adapted for holding the cam against action; and instrumentalities operative at a certain point for releasing the cam whereby it will open the valve to permit the drip-supply from said hopper to pass into the bag.

16. The combination, with a scale-beam, of hangers suspended therefrom; a support for the bag, connected to said hangers and having means for securing a bag thereto; a drip-hopper also suspended from the scale-beam and provided with a valve; a counterweighted arm secured to said valve and having a branch arm; a cam in position to engage said arm to operate the valve; a latch adapted to engage the cam to hold the same against action; means for tripping the latch to release the cam, whereby the valve can be opened to permit the drip to pass into the bag.

17. The combination, with a scale-beam, of hangers suspended therefrom; a bag-support connected with the hanger and having means for securing a bag thereto; a drip-hopper also suspended from the scale-beam and having a valve; a counterweighted arm secured to said valve and provided with a branch arm; a stop on said drip-hopper against which the valve is adapted normally to bear; a cam having a shouldered lug and mounted on the bag-support and also adapted to engage said branch arm; a counterweighted latch shiftably carried by the bag-support; a tripper for said latch, situated on the framework; and a counterweighted arm secured to said cam.

18. The combination, with a scale-beam, of two receivers suspended therefrom one of which has a valve; stream-supplying means for said receivers adapted to deliver to the valved receiver a drip-supply; a device supported independently of the valve, for operating the same; a latch adapted normally to hold said valve-operative device out of action; means for tripping the latch, to release the valve-operating device whereby the valve can be opened to permit the drip-supply to pass from the receiver; and locking means operative on the opening of the valve to block the ascent of the scale-beam.

19. The combination, with a scale-beam, of two receivers suspended therefrom one of which has a valve; stream-supplying means for said receivers, adapted to deliver a drip-supply to the valved receiver; a cam for operating said valve; a stationary cam; a locking-arm coöperative with the first-mentioned cam and adapted to engage the working face of the stationary cam; a latch in position to engage the valve-operating cam; and means for tripping said latch to release the cam whereby the valve can be opened to permit the drip-supply to pass from the valved receiver.

20. The combination, with a scale-beam, of hangers suspended therefrom; a bag-support having a spur for securing a bag thereto; a transverse plate connected with the hangers and secured to said support; a drip-hopper attached to said transverse plate; and means for discharging the drip-hopper into a bag on said support, at a predetermined point.

21. The combination, with a scale-beam, of hangers suspended therefrom; a bag-rest secured to said hangers; a transverse plate provided with clamps for engaging the hangers; a bag-support furnished with a device for securing a bag thereto, said bag-support being secured to the transverse plate and having a valve; and means for operating said valve.

FRANCIS H. RICHARDS.

Witnesses:
F. N. CHASE,
ANDREW FERGUSON.